United States Patent
Hamilton et al.

(10) Patent No.: US 9,959,430 B2
(45) Date of Patent: May 1, 2018

(54) COUNTERFEIT MICROELECTRONICS DETECTION BASED ON CAPACITIVE AND INDUCTIVE SIGNATURES

(71) Applicant: The United States of America as represented by the Secretary of the Navy, Washington, DC (US)

(72) Inventors: Brett J. Hamilton, Heltonville, IN (US); Andrew M. Howard, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 501 days.

(21) Appl. No.: 14/615,030

(22) Filed: Feb. 5, 2015

(65) Prior Publication Data

US 2015/0219714 A1    Aug. 6, 2015

Related U.S. Application Data

(60) Provisional application No. 61/936,020, filed on Feb. 5, 2014.

(51) Int. Cl.
*G06F 21/73* (2013.01)
*G01R 31/28* (2006.01)
*G01R 31/26* (2014.01)

(52) U.S. Cl.
CPC ............. *G06F 21/73* (2013.01); *G01R 31/26* (2013.01); *G01R 31/2837* (2013.01); *G01R 31/2839* (2013.01); *G01R 31/2851* (2013.01)

(58) Field of Classification Search
None
See application file for complete search history.

(56) References Cited

U.S. PATENT DOCUMENTS 4,129,826 A * 12/1978 Mills ...................... G01R 31/00
324/606
4,506,212 A * 3/1985 Melia .................. G01R 31/3004
324/73.1

(Continued)

FOREIGN PATENT DOCUMENTS

WO     WO 2015087390 A1 *  6/2015  ............. G01N 27/02

*Primary Examiner* — John Kuan
(74) *Attorney, Agent, or Firm* — Christopher A. Monsey

(57) ABSTRACT

Systems and methods for detecting counterfeit integrated circuits are provided. One exemplary embodiment of a method can include: providing an integrated circuit for testing; and characterizing capacitive and inductive loading of the integrated circuit power for a specified frequency range; wherein the characterizing step further comprises applying a low level alternating current to a power pin while measuring for capacitance characterization conditions created by the integrated circuit's internal capacitance and inductance responses, wherein by sweeping the alternating current signal across a specified frequency range one or more capacitance related device signature can be created and used to identify a component as originating from a trusted source or not. A system can include components and machine readable instructions for operating the components using exemplary methods. Exemplary embodiments can include automated systems that can also be used with the device signature on a production line or in a supply chain verification location.

9 Claims, 8 Drawing Sheets

(56) References Cited

U.S. PATENT DOCUMENTS

| | | | |
|---|---|---|---|
| 6,766,485 B1 * | 7/2004 | Sakaguchi | G01R 31/3004 324/762.02 |
| 8,395,407 B2 * | 3/2013 | Weitemeier | G01R 31/2815 324/756.07 |
| 2003/0146763 A1 * | 8/2003 | Sunter | G01R 31/2812 324/527 |
| 2011/0133752 A1 * | 6/2011 | Weitemeier | G01R 31/2815 324/555 |
| 2015/0067422 A1 * | 3/2015 | Hamilton | G06F 11/24 714/724 |

* cited by examiner

```
- Fast & Repeatable measurements across SN's and lots
- IDT71124 used for baseline analysis
              SN 01 = 3.19nF (Lot A)
              SN 31 = 2.90nF (Lot B)
              SN 10 = 2.91nF
              SN 11 = 2.90nF
              SN 12 = 2.88nF
              SN 13 = 2.91nF
```

Fig. 1

```
        Part         SN#    Good      SN#    Suspect
Suspect Case #1      16    59.4pF      4     15.0pF
                     17    59.9pF      5     14.5pF Suspect Case #2      19     5.2nF      7     14.9nF
                     20     5.13nF     8     14.5nF
```

Fig. 2

From Fig 8A

120 — Selecting one or more device signature data from at least one said candidate device signature data and recording one of said plurality of capacitance measurement data associated with said selected candidate device signature data and frequency at which said capacitance measurement was taken for each selected device signature data 122 — Providing a second integrated circuit having a second power pin and internal electrical circuit manufactured to be a copy of the first integrated circuit, measuring capacitance of said second power pin at said alternating current signal, modulating said alternating current signal based on each said one or more said selected device signature frequencies, and measuring capacitance values at each said one or more said selected device signature frequencies to produce one or more capacitance comparison data associated with each selected device signature, comparing said one or more capacitance comparison data with a respective said selected device signature data, and determining a match or not match between respective said device signature data and said respective capacitance comparison data, and determining if said second integrated circuit is an acceptable or unacceptable part based on said match or no match determination

Fig. 8B

COUNTERFEIT MICROELECTRONICS DETECTION BASED ON CAPACITIVE AND INDUCTIVE SIGNATURES

CROSS-REFERENCE TO RELATED APPLICATIONS

The present application claims priority to U.S. Provisional Patent Application Ser. No. 61/936,020, filed Feb. 5, 2014, entitled "COUNTERFEIT MICROELECTRONICS DETECTION BASED ON CAPACITIVE AND INDUCTIVE SIGNATURES," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 103,079) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Integrated circuit (IC) testing can focus on specification based electrical testing which is labor intensive to prepare, requires costly automated test equipment (ATE), and takes a considerable amount of time, e.g., weeks or months, to execute. Full electrical specification testing at temperature can be used for counterfeit part detection. Such testing is expensive in both time and cost and may not be the most effective screening method to detect die substitution in which the counterfeit meets the manufacturer's specifications.

Data from a "Golden Device" can be used as a part of an effort to find outliers in a histogram. This approach works fairly well if a "Golden Device" from the same lot and foundry is available and enough parts are tested to enable good statistical histograms. These conditions are often not met when screening "older" out of production devices.

Systems can be based solely on acquisition of input/output (I/O) pin current-to-voltage (IV) curves that are compared to a "Golden Device" database. A common problem with these simple methods of acquisition and comparison is that they are generally not good at accounting for normal manufacturing process variations which can vary with manufacturer processes and foundries. They also tend to focus on a single stress indicator, such as I/O shift due to electrostatic discharge (ESD). Thus, such approaches do not represent comprehensive evaluation methods. An improvement is required in order to address supply chain participant needs and offer various advantages necessary to advance the state of the art.

The present invention embodiment relates to counterfeit microelectronics detection that includes approaches based on capacitive and inductive signatures. Existing approaches to counterfeit screening solutions do not offer such a capability and do not consider how to screen parts that pass electrical test, but are not from a legitimate manufacturer. Existing solutions focus on physical characteristics such as material compositions, which are not effective when evaluating an enclosed die. Full electrical test is also ineffective if a counterfeit component meets the original manufacturer's specifications or results are needed in a timely manner.

One exemplary embodiment of the invention can include counterfeit, defective, or suspect microelectronics detection by utilizing power pin based characterization of capacitive and inductive signatures across a specific frequency range using a precision impedance analyzer. Advantages associated with an embodiment of the invention include a major shift in testing paradigms by use of power pin capacitive and inductive signatures utilizing impedance measurement techniques for counterfeit part screening. One exemplary embodiment of the invention includes a method that offers easier implementation than current means, is rapidly executable, and very effective in distinguishing particular classes of counterfeits including those in which the silicon die is not from an authorized, attributed, or correct manufacturer/supplier, is being passed off as new, misrepresented as one thing when it is another ((e.g., an item is used, remarked, salvaged, wrong die, aged, damaged, unauthorized modifications, etc when the item is characterized as new, from an original equipment manufacturer (OEM) or foundry directly, etc), in a particular condition when it is not so, or is noticeably different electrically than the desired application requires.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1 shows test results in accordance with an embodiment of the invention from two lots (Lots A and B) of a particular component, e.g., an IDT71124 memory chip;

FIG. 2 shows a comparison of test results in accordance with an embodiment of the invention showing distinctions between two groups of device under test (DUT);

FIG. 8B shows a continuation of the FIG. 8A process in accordance with an exemplary embodiment.

DETAILED DESCRIPTION OF THE DRAWINGS

Figure 3:
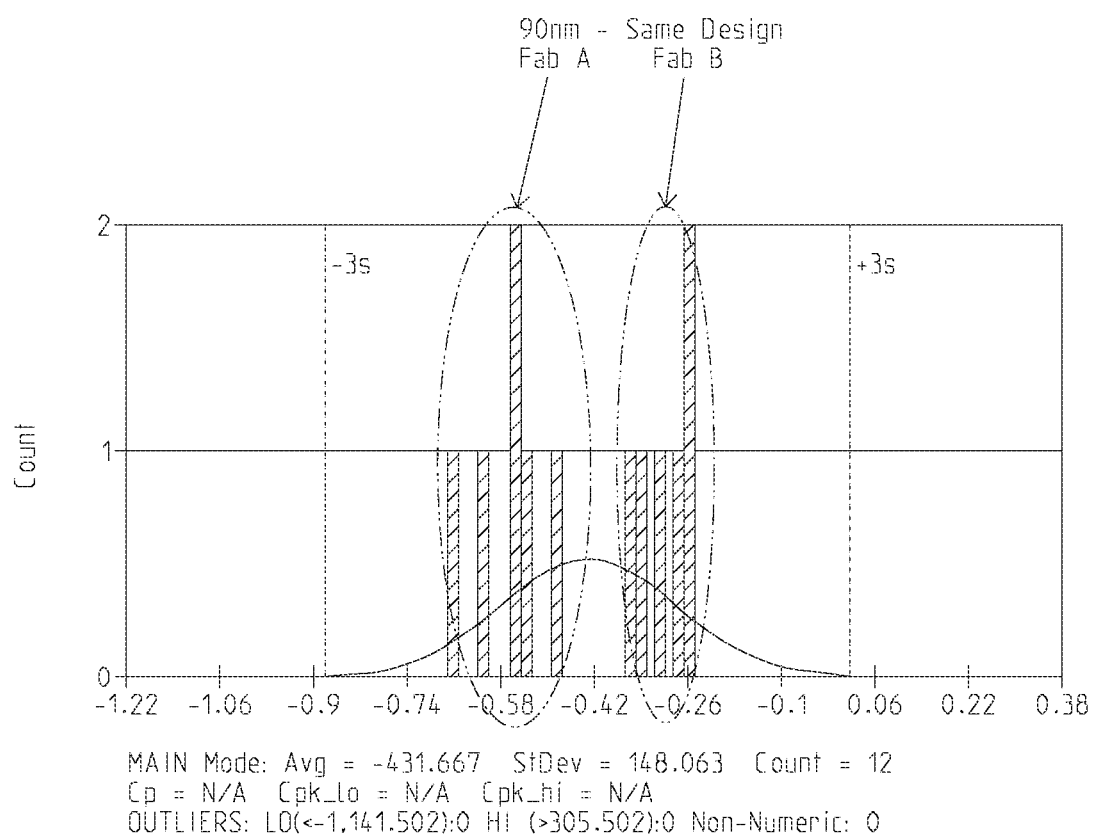
FIG. 3 shows additional test results in accordance with an embodiment of the invention showing a significant degree of sensitivity between test groups.

The embodiments of the invention described herein are not intended to be exhaustive or to limit the invention to precise forms disclosed. Rather, the embodiments selected for description have been chosen to enable one skilled in the art to practice the invention.

One embodiment of the invention can include a method for screening counterfeit ICs by characterization of capacitive and inductive loading of an IC power pin for a specified frequency range. This exemplary technique can be effective in evaluations to ensure a correct die from a trusted manufacturer is utilized in the IC. Exemplary techniques in accordance with the invention are easier and more cost effective to implement compared to full specification based electrical test and has proved more effective for a class of counterfeit IC (die substitution). One embodiment can utilize a fact that no two foundries produce an identical die due to differences in manufacturing equipment, raw materials and other processing parameters. The result of this observation is subtle differences that can be detected using exemplary enhanced impedance measurement techniques. One exemplary method applies low-level alternating current (AC) signals to an IC power pin while measuring distortion created by the IC's internal capacitance and inductance. By sweeping or adjusting this AC signal input to a DUT across a specified frequency range an information rich device signature is created, yielding subtle measurement data characteristics necessary to identify a die as originating from an appropriate or attributed source e.g., a legitimate foundry that actually manufactured the IC.

ICs available from past assessments were used for evaluation as part of this inventive effort. For example, FIG. 1 lists test results from two lots (Lots A and B) of DUTs, e.g., IDT71124 memory devices. In this example, using a network analyzer, capacitance of the DUTs' power pin having a signal applied at 100 mV and 1.2 kHz could be precisely measured and used to show similar measurements from two separate lots of DUT memory ICs from trusted sources (note serial numbers (SN) 10, 11, 12 and 13 are not labelled as belonging to a lot but they are all known good devices—in this example assume SNs 10, 11, 12, and 13 fall into Lot B). While data in FIG. 1 shows values of capacitance at 1.2 kHz, other frequencies and voltages can be used as well or vary by device and even test equipment used. The FIG. 1 DUT parts from Lot B are shown a tight bunching around 2.9 nF, whereas the part from Lot A has a value of 3.19 nF. These measurements were taken to show that same DUT part types from different lots or distributors should be close enough as to not give rise to suspicion of authenticity. In this case, the data from the known-good and related parts can be factored into a standard deviation computation (e.g., see below) in order to compute a range of acceptable capacitance related values which can be used in subsequent testing of articles with the same part number or descriptive nomenclature (e.g., different serial numbers but same component from same foundry/manufacturer).

More test results using an embodiment of the invention are shown in FIG. 2 that show a clear distinction between known-good and suspect counterfeit DUT ICs. FIG. 2 shows two different instances of known good DUT samples being compared to suspect DUT counterfeit devices of the exact same part number. Exemplary suspect case #1 shows that, e.g., known-good parts with SN 16 & 17 have much higher capacitive readings that test article parts SN 4 & 5. All four of these devices had the same part number markings but showed different inductive characteristics. Further investigation confirmed that the four suspect devices did have different die inside them confirming SN 4 & 5 were counterfeit as the electrical results in FIG. 2 had shown. Exemplary suspect case #2 used different device types than case #1, but showed the impedance counterfeit detection method worked just as well on a DUT with a completely different part number. In this case SN 19 & 20 were the known good devices and found to be much lower in their capacitance reading taken in accordance with an embodiment of the invention than the suspect SN 7 & 8.

In one scenario, an exemplary embodiment of the invention was applied to two sets of DUT ICs with identical designs, but manufactured at different locations. In this example, two foundries associated with the two sets of DUT ICs were both separate US East Coast foundries operated by a single company. Accordingly, one could expect very similar equipment, materials, and processes would be used by this single manufacturer. FIG. 3 shows a histogram chart showing impedance characteristics measurements of twelve parts (six from each fabrication facility) produced in accordance with an embodiment of the invention are sensitive enough to show distinction between two separate parts having identical design part numbers that were fabricated at different sites. A histogram shows how often a value (in this case capacitance measurements from the twelve tested parts shown on the x axis) occurs. In particular, FIG. 3 shows test results from an exemplary embodiment of the invention is sensitive enough to place six parts evaluated from each of the two foundries in distinct groupings (Fab A and Fab B groups) based on testing results.

Figure 4:
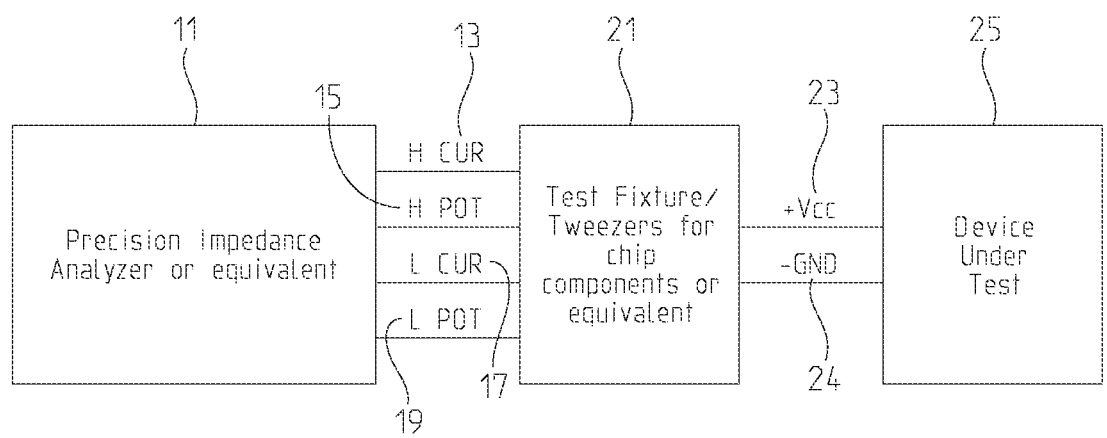
FIG. 4 shows on exemplary simplified test setup and test components in accordance with one embodiment of the invention.

FIG. 4 shows a block diagram of a test setup in accordance with one embodiment of the invention. An exemplary embodiment can include providing test setup steps that can have the following exemplary equipment such as, for example: a precision impedance analyzer 11 e.g., Agilent® 4294A or equivalent; a test fixture/tweezers for components 21, e.g., HP16034B or equivalent that permits coupling power and ground pins on the DUT 25 with the impedance analyzer 11. In an exemplary embodiment the test fixture 21 can be coupled with the precision impedance analyzer 11 via lines H CUR 13 (high current), H POT 15 (high potential), L CUR 17 (low current) and L POT 19 (low potential). In addition, the test fixture 21 can be coupled with a DUT 25's+Vcc (voltage supply pin(s)) 23 and −GND 24 (ground pin(s)) lines. In this simplified embodiment of FIG. 4, two DUT pins (Vcc 23 and GND 19) are being coupled via probes or lines from the test fixture 21. However, other embodiments can include a system for testing multiple combinations of pins. Exemplary embodiments can include a setup where the precision impedance analyzer 11 can be configured to supply signals to the test fixture 21 and then to the DUT 25's pins (e.g., 23, 19) with a frequency sweep range of, e.g.: 40 hz-1.5 kHz with an exemplary voltage level of 100 mV, and an exemplary measure mode or parameters of Cs-Q or Cs-R. In this example, measurement parameters refer to settings on a signal analyzer for traces displayed in plots e.g., Cs-Q—Trace A and/or Trace B: Trace A: Equivalent series capacitance and Trace B: Q values. In this example, Cs stands for capacitance value measured with series equivalent circuit model and Q stands for quality factor (e.g., inverse of dissipation factor—another type of measurement of loss rate of energy of a mode of oscillation). However, in this embodiment, Q is not relied upon; capacitance is primarily relied upon for this exemplary embodiment. For measurement mode and parameters Cs-R, an impedance analyzer can be set to display Trace A as Equivalent series capacitance and Trace B as Equivalent series resistance. In this example, R represents resistance.

Figure 5:
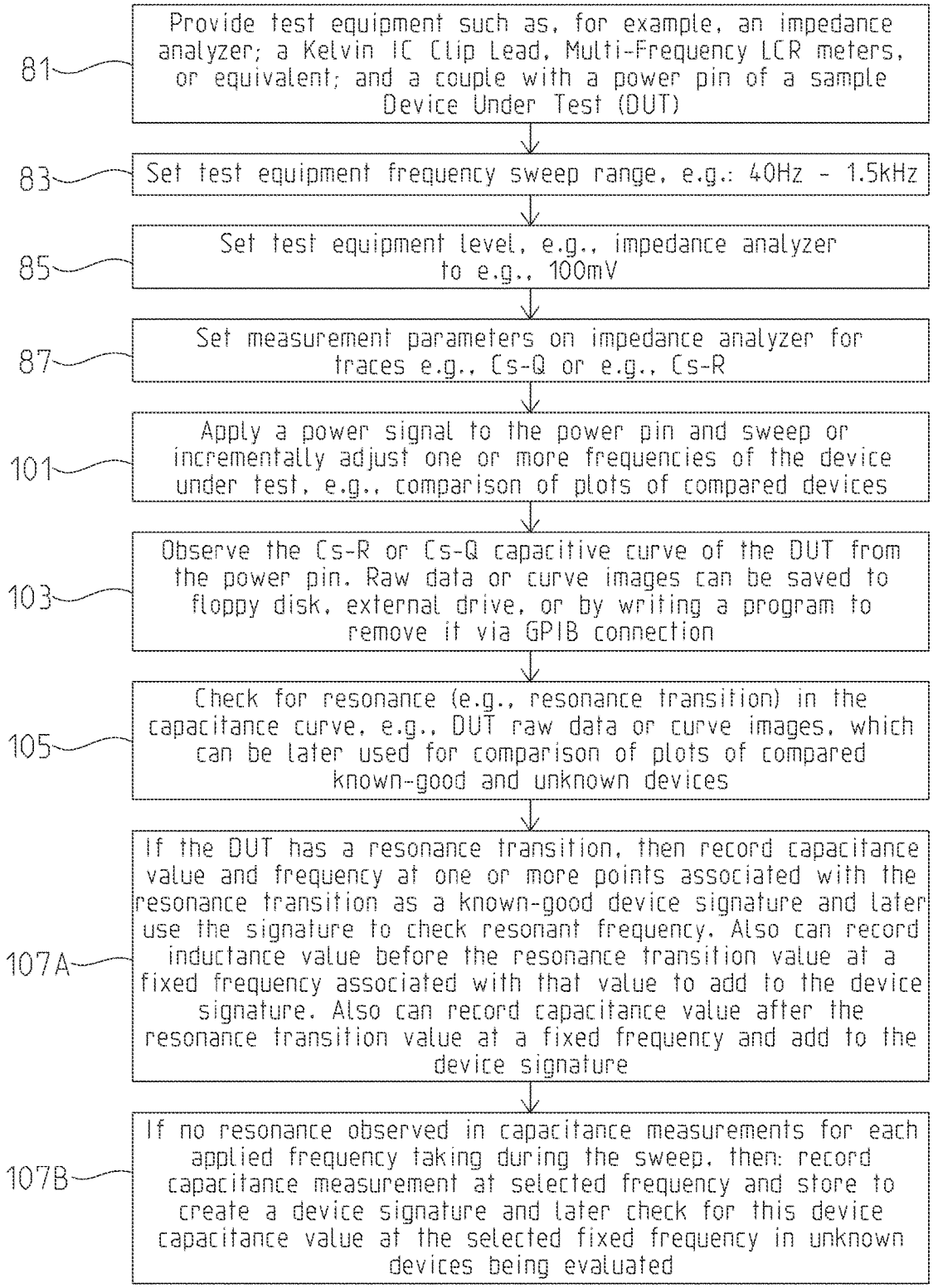
FIG. 5 shows a method in accordance with one embodiment of the invention.
Figure 6:
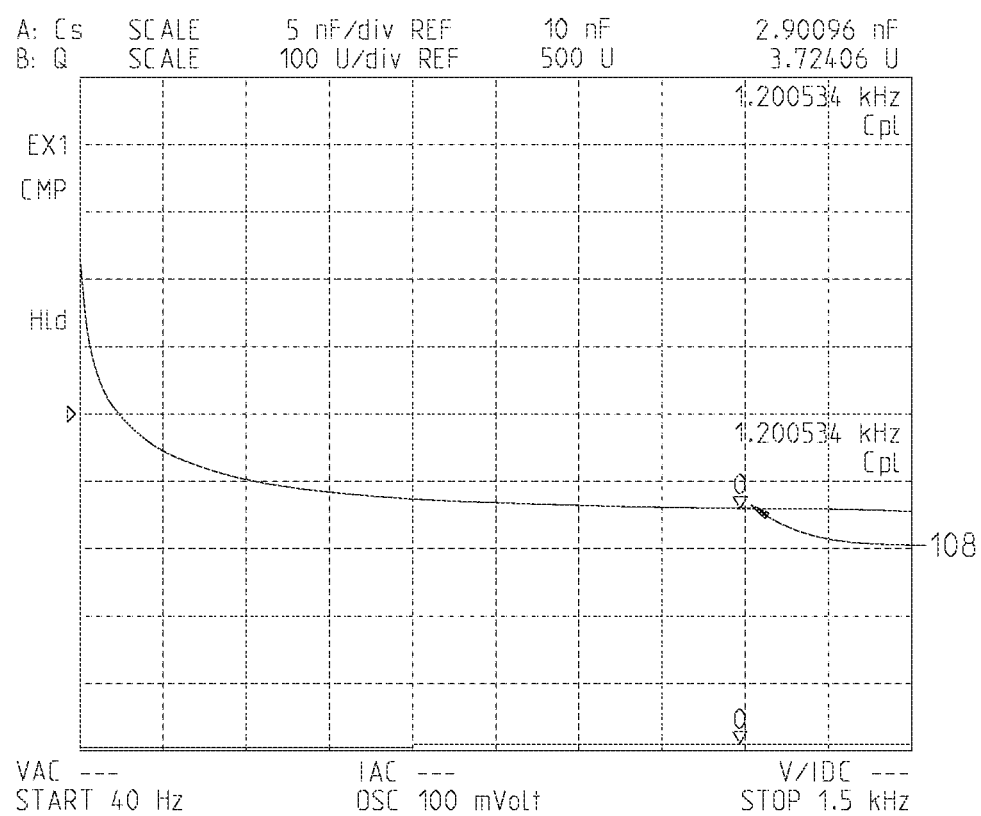
FIG. 6 shows an example of a purely capacity impedance curve showing no sign of resonance over a measured frequency range.
Figure 7:
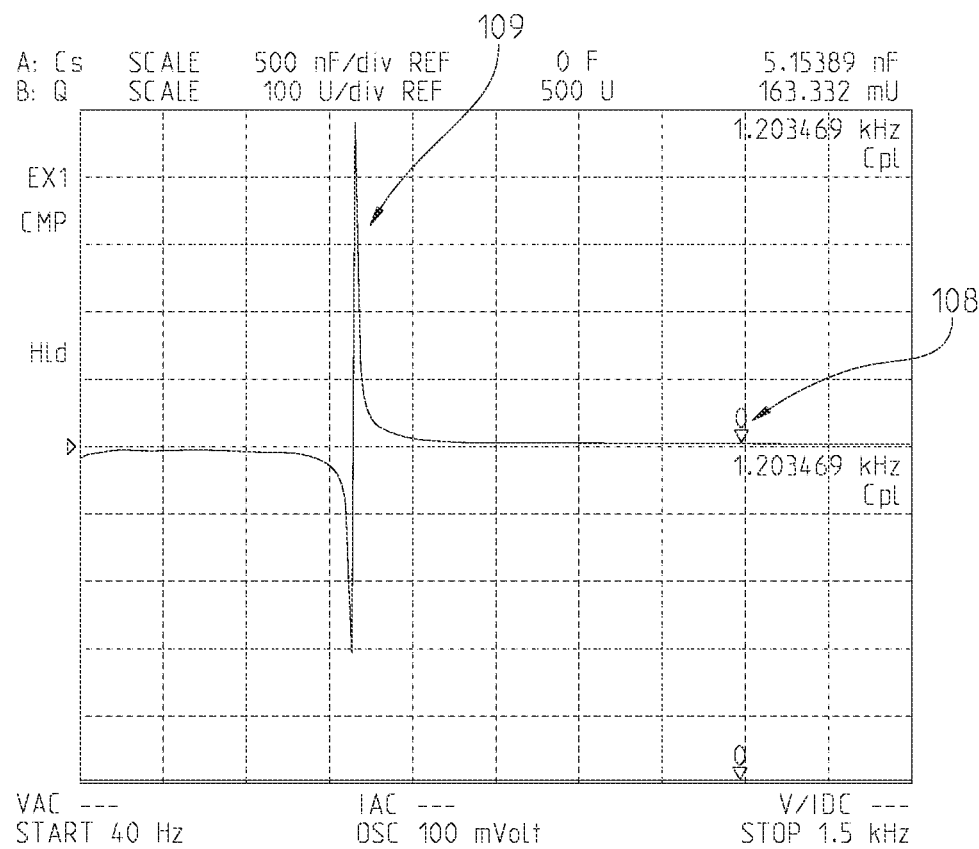
FIG. 7 shows an exemplary result of an impedance curve showing inductive behavior prior to a resonant frequency.

FIG. 5 shows a method in accordance with one exemplary embodiment of the invention. Generally, a method for detecting counterfeit IC components can include a process comprising characterization of capacitive and inductive loading (e.g., from an applied signal) of at least one DUT IC power pin for a number of measurements at separately measured frequencies within specified frequency range. In particular, an exemplary method applies low level AC signal to a known good DUT IC's power pin while measuring elements of the DUT IC's internal capacitance and inductance signatures. A precision impedance analyzer can be used to acquire device power impedance signatures (e.g., known good signature) for the known good DUT IC device ("golden device"). This acquired known good signature is used for comparison against other measured DUT IC device signatures for counterfeit determination. At step 81: Provide an exemplary test system including an impedance testing system or analyzer and test interface structure adapted to couple the impedance testing system or analyzer with a DUT power pin (Vcc) and ground pin (GND), such as, for example, as in FIG. 4. At step 83: Set test system equipment's frequency sweep range, e.g., 40 hz-1.5 kHz. At step 85: Set test system equipment, e.g., impedance analyzer, to generate an oscillating voltage signal level at e.g., 100 mV. In this embodiment, the oscillating voltage signal is applied to the DUT Vcc pin through the test interface structure, e.g., fixture/lines. Step 87: Set measurement parameters on the test system equipment, e.g., impedance analyzer, for generating capacitive curve traces (e.g., capacitance measured over a given frequency range) to e.g., Cs-Q or e.g., Cs-R. At step 101: Sweep one or more frequencies of the DUT IC, e.g., from Step 83, on the DUT IC pin, e.g., on the DUT IC Vcc power pin. In this embodiment, a sweep refers to a function performed by the impedance analyzer which applies the selected voltage across the selected frequency range (e.g., from lowest to highest selected frequency range) to generate a capacitance curve plot such as shown in FIGS. 6 and 7. At step 103: Examine the Cs-R or Cs-Q capacitive curve plot of the DUT IC from step 101. At step 105: Check for resonance (e.g., resonance transition) in the capacitance curve, e.g., DUT raw data or curve images, which can be later used for comparison of plots of compared known-good and unknown devices. Generally, at step 107A: if the DUT IC has resonance transition (e.g., a spike in capacitance curve plot at a particular frequency or frequency range, e.g., see FIG. 7, capacitance curve plot segment 109), then determine frequency associated with one or more capacitance curve plot measurements data associated with the resonance transition (e.g., 109). In particular, an embodiment at step 107A: If the DUT has a resonance transition, then record capacitance value and frequency at one or more points associated with the resonance transition as a known—good device signature and later use the signature to check resonant frequency. Also can record inductance value before the resonance transition value at a fixed frequency associated with that value to add to the device signature. Also can record capacitance value after the resonance transition value at a fixed frequency and add to the device signature. In this example, resonance transition 109 is shown on the capacitance curve plot where the capacitance curve goes from negative to positive which can be shown as a spike or a jump in the measured capacitance value along an y axis (where frequency is shown on an x axis) (e.g., see FIG. 7). In particular, an exemplary method can include evaluating the capacitance curve plot at three test result points when the resonance transition is shown by the spike or jump in the plot. In this example, the first test result point is a capacitance curve plot point before the resonance transition, the second test result point is a capacitance curve plot point at the resonance transition, and the third test result point is a capacitance curve plot point after the resonance transition. Frequency settings of the impedance analyzer at the first, second, and third test result points are recorded for later use in setting frequency settings of the test system to evaluate unknown DUT ICs for consistency of measurement between compared the known-good DUT IC versus unknown DUT IC devices. These frequency settings associated with the identified capacitance value at the first, second, and third test result points can be, for example, a positive capacitance measurement which can be measured at a fixed frequency after the resonant transition point's frequency (e.g., second test result point) for consistency of the measurement between devices. Generally, at step 107B: If no resonance transition is observed, then check capacitance value at one selected fixed frequency point of the capacitance plot curve which can be, for example, a segment of positive capacitance measurements (e.g., a flat portion of the capacitance curve plot (e.g., FIG. 6, 108)) which can be measured at the fixed frequency in subsequent testing of unknown DUT ICs for consistency of measurement between devices. In a particular embodiment, at step 107B: if no resonance observed in capacitance measurements for each applied frequency taking during the sweep, then: record capacitance measurement at selected frequency and store to create a device signature and later check for this device capacitance value at the selected fixed frequency in unknown devices being evaluated.

With regard to step 101, one exemplary embodiment can include a testing sequence can sweep the frequency range from step 83 on the DUT IC's power pin. In the exemplary embodiment a high (+) terminal of a Kelvin IC Clip Lead, Test Fixture/Tweezers for components or equivalent part can go to a DUT IC device power pin while the low (−) terminal can go to the DUT IC's device GND pin.

With regard to step 103, one exemplary embodiment can include for example, observing the Cs-R or Cs-Q capacitive plot curve associated with the DUT IC's selected power pin. Raw data or capacitance curve plot images can be saved to a recording medium e.g., external hard drive, or by writing a program to extract such data or images via, e.g., a signal or data connection or equivalent.

In one embodiment, parts that are expected to be the same can have nearly the same capacitive value when the capacitance plot curve flattens out at a fixed frequency associated with a test point where the capacitive measurements are compared. A determination of nearly the same capacitance values that is used to determine candidate device signature test measurements data points can be based on a determination of acceptable capacitance variation across a set of different applied frequencies. In one embodiment, one or more acceptable nearly the same capacitance values can based on selecting a predetermined percentage variation in a capacitance measurements on a single known-good DUT IC. The predetermined percentage variation can also be selected based on a determination of a segment of the DUT IC's capacitance curve plot having a zero slope change or a smallest change in slope values (rise over run) between at least two capacitance data measurements (e.g., see FIGS. 6 and 7, capacitance curve plot segment 109). Where multiple known-good DUT ICs are tested in accordance with an embodiment of the invention to produce device signatures for later use in identifying suspect parts, a standard deviation approach can be used determine a nearly the same data value. For example, nearly the same capacitive values can be determined based on running an exemplary embodiment test process on a lot of known-good DUT ICs where a standard deviation computation is determined based on analysis of the known-good parts. Testing in accordance with the invention can be conducted on a number of known-good parts with the same part number. Data collected in accordance with the invention can then be analyzed to determine a variety of statistical measures including standard deviation analysis. In this example, a standard deviation is a measure that is used to quantify the amount of variation or dispersion of a set of data values. A low standard deviation indicates that the set's data points tend to be very close to the mean (also called the expected value) of the set, while a high standard deviation indicates that the data points are spread out over a wider range of values. In one embodiment, a nearly the same capacitance value can be based on a three standard deviation measure derived from capacitance measurement data produced from testing known-good parts having identical part numbers or identifiers in a selected lot to produce a desired predetermined percentage variation or nearly the same capacitance value measure.

If the selected DUT IC part displays resonance transition, like parts can also have the same or nearly the same inductance (e.g., negative capacitance) value before the resonant frequency and the same or nearly the same capacitive value after the resonance at frequencies where the capacitance plot curve is level or approximately level (e.g., flat along an x axis).

In certain embodiments, 40-1.5 kHz is a desirable range that can be found while testing numerous DUT IC devices. A different range may be required for other DUT IC devices but a start sweep at 40 Hz with a stop sweep of 1.5 KHz can capture desired information e.g., power supply impedance. 100 mV AC input provides a desirable input range found while testing numerous devices. A different input voltage range may be required for other devices, but 100 mV can be a useful starting point.

In certain embodiments a precision impedance analyzer can be configured to conduct several measurement types. For example, it is desirable to use the Equivalent Series Capacitance measurement on Trace A with Equivalent Series Resistance on Trace B (Cs-R) or with Q value on Trace B (Cs-Q).

Resonance frequency, in one example herein, is shown as a resonance transition spike seen in the capacitance curve plots in some of the drawings. An indication of a resonance frequency indication can be where the frequency sweep produces a plot going from inductive (negative capacitance) to capacitance (positive). On a purely capacitive chart a test plot can show a negative capacitance and then the spike in the graph, after which, the capacitance should read positive values. Parts that are expected to be the same in subsequent testing should have nearly the same capacitive value when the capacitance curve plot flattens out at a fixed frequency point where the capacitive measurements for known-good DUT IC versus unknown DUT ICs are compared at. Non-counterfeit or nonconforming DUT ICs should also have the same, close, or very close resonance frequency if a resonance transition is present in the unknown DUT IC as compared to the known-good DUT IC signature. If the known-good DUT IC part displays resonance transition at a particular frequency point, like parts should also have the same or nearly the same inductive (negative capacitance) value before the resonance transition frequency and nearly the same capacitive value after the resonance transition at frequencies where the capacitance curve plot is level or substantially level.

FIG. 6 shows a Cs-Q example of an exemplary "golden device" that was a known good sample. This curve sweeps from 40 Hz to 1.5 kHz with 100 mV input signal. The FIG. 6 results show a capacitive curve plot with solely positive capacitance values indicating that there was no resonance transition observed on this part. The exemplary reference frequency selected to make the capacitance measurement was 1.2 kHz yielding a value of 2.90 nF. The capacitance measurements in this case (e.g., no resonance transition) are then used in subsequent unknown DUT IC testing.

FIG. 7 shows a Cs-Q example plot of a device that had the same exact part marking as the device from FIG. 6 example. This capacitance plot curve sweeps from 40 Hz to 1.5 kHz with 100 mV input signal. The results in FIG. 7 show a capacitive curve plot that has both positive and negative capacitance values indicating that there was indeed resonance transition observed on this part. The reference frequency selected to make the capacitance measurement in FIG. 7 was 1.2 kHz yielding a value of 5.15 nF. The FIG. 7 DUT IC device was further examined based on this observation and it was found that it had an incorrect die inside the DUT IC's package indicating that it was a counterfeit device.

FIGS. 6 and 7 demonstrate that by having a known good sample and comparing it to other sample devices tested in accordance with an embodiment of the invention, an inspection can quickly and accurately determine that the compared parts, e.g., die, are not equivalent matches even though such a counterfeit or unauthorized condition is not visible from visual inspection and takes substantially less time than convention means. The two devices shown in FIGS. 6 (known good DUT IC) and 7 (evaluated DUT IC that was found counterfeit or bad) showed that the suspect counterfeit device (FIG. 7) had a different capacitance curve plot (FIG. 6), had resonance transition, and had different capacitive readings on the unknown DUT ICs' power pin than that of the golden device DUT IC sample.

Note an embodiment of the invention can also be used when both known-good DUT IC and unknown-DUT both have measurably different capacitances at fixed points. For example, an embodiment of the invention can include determinations of good versus not good where there are different capacitance values at the same fixed frequency point or different resonance frequencies associated with comparisons of known-good versus unknown DUT IC capacitance plot curves.

Embodiments of the invention can also include providing an unknown integrated circuit, e.g., DUT IC, for testing. A next step can include commencement of characterization of capacitive and inductive loading of the integrated circuit power pin for a specified frequency range comprising. A next step can include applying a low level alternating current to the power pin, determining a first capacitance curve plot for the integrated circuit created from measuring the integrated circuit's power pin internal capacitance and inductance. A next step can include sweeping or incrementally adjusting the alternating current across the specified frequency range in order to create a device signature necessary to identify a component as originating from a non-counterfeit foundry. Device signatures can include capacitance measurements at a measurement frequency that are associated with resonance transitions as described above to include three data points such as the above referenced first, second and third test data points associated with resonance transitions (e.g., capacitance going from negative to positive or vice versa). Device signatures can also be capacitance measurements at a selected frequency within the frequency sweep range that have a slope with adjacent data points in a capacitance curve plot which is as close to zero possible as compared with other plot segments comprising two or more data points in the plot.

Figure 8A:
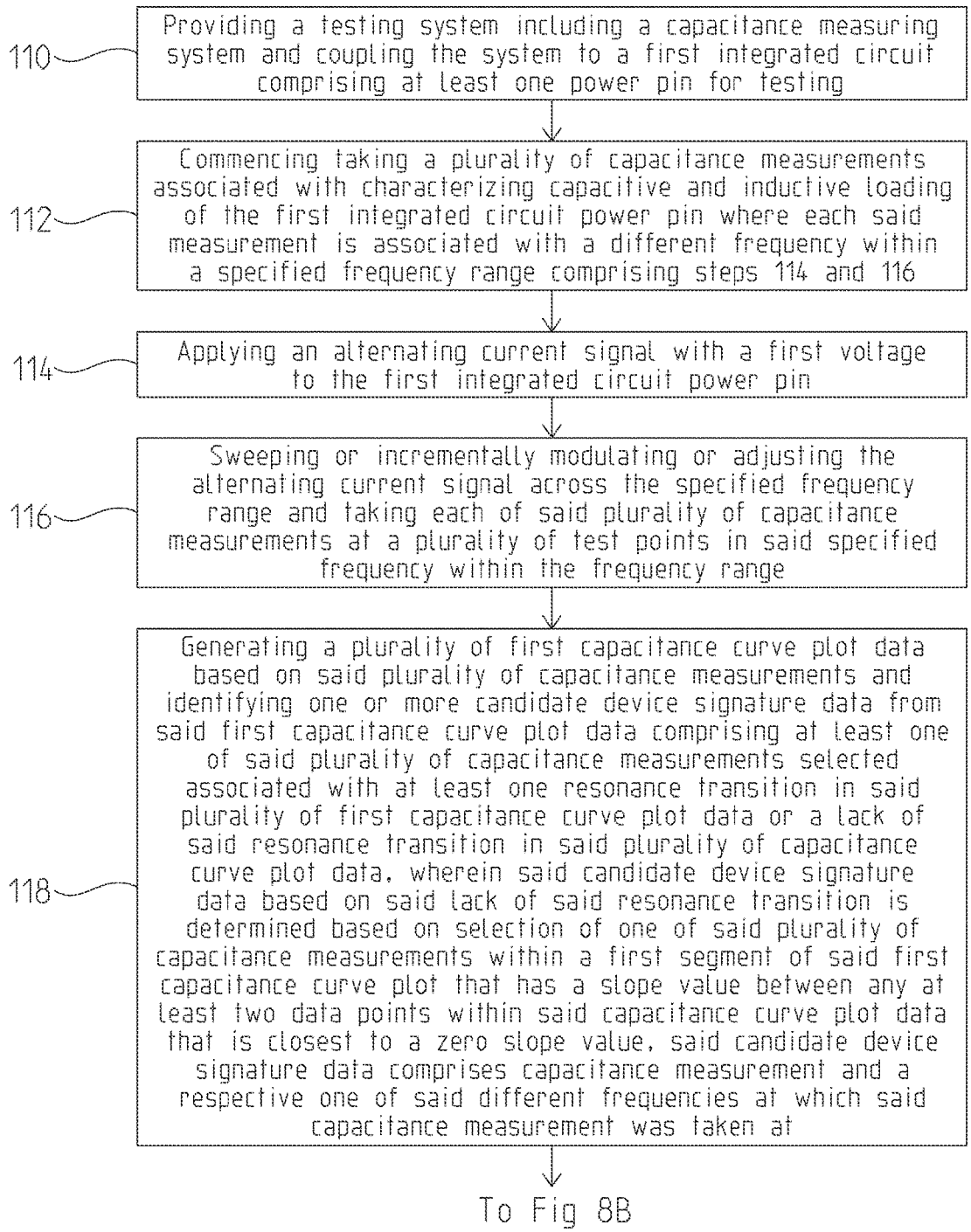
FIG. 8A shows a process illustrating one method in accordance with an exemplary embodiment.

FIGS. 8A and 8B shows block diagrams illustrating another exemplary method associated with detecting counterfeit integrated circuits. At step 110, providing a testing system including a capacitance measuring system and coupling the system to a first integrated circuit comprising at least one power pin for testing. At step 112, commencing taking a plurality of capacitance measurements associated with characterizing capacitive and inductive loading of the first integrated circuit power pin where each said measurement is associated with a different frequency within a specified frequency range comprising steps 114 and 116. At step 114, applying an alternating current signal with a first voltage to the first integrated circuit power pin. At step 116, sweeping or incrementally modulating or adjusting the alternating current signal across the specified frequency range and taking each of said plurality of capacitance measurements at a plurality of test points in said specified frequency range. Referring to FIG. 8B, at step 118, generating a plurality of first capacitance curve plot data based on said plurality of capacitance measurements and identifying one or more candidate device signature data from said first capacitance curve plot data comprising at least one of said plurality of capacitance measurements selected associated with at least one resonance transition in said plurality of first capacitance curve plot data or a lack of said resonance transition in said plurality of capacitance curve plot data, wherein said candidate device signature data based on said lack of said resonance transition is determined based on selection of one of said plurality of capacitance measurements within a first segment of said first capacitance curve plot that has a slope value between any at least two data points within said capacitance curve plot data that is closest to a zero slope value, said candidate device signature data comprises capacitance measurement and a respective one of said different frequencies at which said capacitance measurement was taken at. At step 120, selecting one or more device signature data from at least one said candidate device signature data and recording one of said plurality of capacitance measurement data associated with said selected candidate device signature data and frequency at which said capacitance measurement was taken for each selected device signature data. At step 122, providing a second integrated circuit having a second power pin and internal electrical circuit manufactured to be a copy of the first integrated circuit, measuring capacitance of said second power pin at said alternating current signal, modulating said alternating current signal based on each said one or more said selected device signature frequencies, and measuring capacitance values at each said one or more said selected device signature frequencies to produce one or more capacitance comparison data associated with each selected device signature, comparing said one or more capacitance comparison data with a respective said selected device signature data, and determining a match or no match between respective said device signature data and said respective capacitance comparison data, and determining if said second integrated circuit is an acceptable or unacceptable part based on said match or no match determination. Note alternative embodiments of the invention can include match or no-match determinations that can be based on ranges (e.g., capacitance value ranges associated with specific single frequency values or a range of frequencies) as well as specific capacitance values at specific frequencies as well as the standard deviation based range determinations. So for example, a three standard deviation based range should encompass all "good" devices relative to the known good sample or lot of known good samples.

Although the invention has been described in detail with reference to certain preferred embodiments, variations and modifications exist within the spirit and scope of the invention as described and defined in the following claims.

The invention claimed is:

1. A method for detecting counterfeit integrated circuits comprising:
   providing a first integrated circuit comprising a power pin for testing;
   characterizing capacitive and inductive loading of the power pin for a specified frequency range, wherein said characterizing step further comprises applying a low level alternating current to the power pin and sweeping or incrementally adjusting an alternating current signal across said specified frequency range;
   measuring a first plurality of capacitance data using a capacitance analyzer section, each one of said first plurality of capacitance data comprises a capacitance data and a frequency value associated with said low level alternating current at which each said capacitance data was measured at;
   determining if one or more of said first plurality of capacitance data shows a first or second capacitance characterization, wherein said first capacitance characterization comprises a change from negative to positive capacitance created by the first integrated circuit's internal capacitance and inductance at different frequencies in said specified frequency range, said second capacitance characterization is associated with one or more segments of a capacitance curve plot of one or more said first plurality of capacitance data having a slope closest to zero as compared to other segments of said capacitance curve plot;
   creating one or more device signature data comprising respective capacitance data associated with said one or more of said first plurality of capacitance data having said first or second capacitance characterization;
   applying at least one or more second electrical signals at a respective one or more second frequencies to at least one power pin of a second device under test that are of a same type as the first integrated circuit;
   applying said low level alternating current on said at least one power pin of said second device under test at one or more frequencies associated with said one or more device signature data;
   measuring one or more second capacitance data from said at least one power pin of said second device under test at said one or more frequencies, wherein said one or more second capacitance data comprises a capacitance measurement at said one or more frequencies associated with said one or more device signature data;
   comparing said one or more device signature data with respective said one or more second capacitance data to determine a match or no match between respective said one or more device signature data and said one or more second capacitance data to identify if said one or more second integrated circuits originating from a foundry that produced the first integrated circuit; and
   outputting comparison data comprising an indicator associated with determining if said second device under test originated from said foundry that produced the first integrated circuit.

2. A method for detecting counterfeit integrated circuits as set forth in claim 1, wherein said outputting step comprises displaying said indicator on a display comprising a digital read-out.

3. A method for detecting counterfeit or mischaracterized integrated circuits as set forth in claim 1, wherein said first integrated circuit or said second device under test is tested in a fixture that removably receives said first integrated circuit or said second device under test.

4. A method for detecting an undesirable condition of an integrated circuit comprising:
prov018ing a testing system including a capacitance measuring system and coupling the testing system to a first integrated circuit comprising at least one power pin for testing;
commencing taking a plurality of capacitance measurements associated with characterizing capacitive and inductive loading of the at least one power pin wherein each said plurality of capacitance measurements is associated with a different frequency within a specified frequency range comprising a first characterization step and a second characterization step, wherein said first characterization step comprises applying an alternating current signal with a first voltage to the first integrated circuit power pin, wherein said second characterization step comprises sweeping or incrementally modulating or adjusting the alternating current signal across the specified frequency range and taking each of said plurality of capacitance measurements at a plurality of test points in said specified frequency range;
generating a plurality of first capacitance curve plot data based on said plurality of capacitance measurements and identifying one or more candidate device signature data from said plurality of first capacitance curve plot data comprising at least one of said plurality of capacitance measurements selected associated with at least one resonance transition in said plurality of first capacitance curve plot data or a lack of said resonance transition in said plurality of capacitance curve plot data, wherein said candidate device signature data based on said lack of said resonance transition is determined based on selection of one of said plurality of capacitance measurements within a first segment of said first capacitance curve plot that has a slope value between any at least two data points within said capacitance curve plot data that is closest to a zero slope value, said candidate device signature data comprises capacitance measurement and a respective one of said different frequencies at which said capacitance measurement was taken at;
selecting one or more device signature data from at least one said candidate device signature data and recording one of said plurality of capacitance measurements associated with said selected candidate device signature data and frequency at which said capacitance measurement was taken for each selected device signature data; and
providing a second integrated circuit having a second power pin and internal electrical circuit manufactured to be a copy of the first integrated circuit, measuring capacitance of said second power pin at said alternating current signal, modulating said alternating current signal based on each said frequency at which said capacitance measurement was taken for each selected device signature data, and measuring capacitance values at each said frequency at which said capacitance measurement was taken for each selected device signature data to produce one or more capacitance comparison data associated with each selected device signature, comparing said one or more capacitance comparison data with a respective said selected device signature data, and determining a match or no match between respective said device signature data and said respective capacitance comparison data to determines if said second integrated circuit is an acceptable or unacceptable part.

5. A method as in claim 4, further comprising outputting said determination of if said second integrated circuit is an acceptable or unacceptable part on a recording or display medium.

6. A method as in claim 5, wherein said outputting step comprises displaying an indicator of said determination if said second integrated circuit is an acceptable or unacceptable part on a display comprising a digital read-out.

7. A method for detecting counterfeit or mischaracterized integrated circuits as set forth in claim 4, wherein said first and second integrated circuits are tested in a fixture that removably receives said first and second integrated circuits.

8. A method for detecting an undesirable condition of an integrated circuit comprising:
providing a testing system including a capacitance measuring system and coupling the testing system to a first integrated circuit comprising at least one power pin for testing;
commencing taking a plurality of capacitance measurements associated with characterizing capacitive and inductive loading of the power pin where each said measurement is associated with a different frequency within a specified frequency range comprising a first characterization step and a second characterization step, wherein said first characterization step comprises applying an alternating current signal with a first voltage to the power pin, wherein said second characterization step comprises sweeping or incrementally modulating or adjusting the alternating current signal across the specified frequency range and taking each of said plurality of capacitance measurements at a plurality of test points in said specified frequency range;
generating a plurality of first capacitance curve plot data based on said plurality of capacitance measurements and identifying one or more candidate device signature data from said plurality of first capacitance curve plot data comprising at least one of said plurality of capacitance measurements selected associated with at least one resonance transition in said plurality of first capacitance curve plot data or a lack of said resonance transition in said plurality of capacitance curve plot data, wherein said candidate device signature data based on said lack of said resonance transition is determined based on selection of one of said plurality of capacitance measurements within a first segment of said first capacitance curve plot that has a slope value between any at least two data points within said capacitance curve plot data that is closest to a zero slope value, said candidate device signature data comprises capacitance measurement and a respective one of said different frequencies at which said capacitance measurement was taken at; and
selecting one or more device signature data from at least one said candidate device signature data and recording one of said plurality of capacitance measurements associated with said selected candidate device signature data and frequency at which said capacitance measurement was taken for each selected device signature data.

9. A method as in claim 8 further comprising:
providing a second integrated circuit having a second power pin and internal electrical circuit manufactured to be a copy of the first integrated circuit;

measuring capacitance of said second power pin at said alternating current signal;

modulating said alternating current signal based on each said frequency at which said capacitance measurement was taken for each selected device signature data and measuring capacitance values at each frequency at which said capacitance measurement was taken for each selected device signature data to produce one or more capacitance comparison data associated with each selected device signature;

comparing said one or more capacitance comparison data with a respective said selected device signature data;

determining a match or no match between respective said device signature data and said respective capacitance comparison data;

determining if said second integrated circuit is an acceptable or unacceptable part based on said determined match or no match.

* * * * *